INVENTOR.
KARL-WILHELM PAUBANDT

ATTORNEY

United States Patent Office 3,793,421
Patented Feb. 19, 1974

3,793,421
SEPARATING METHOD FOR PRODUCING
HOLLOW BODIES
Karl-Wilhelm Paubandt, Witten, Germany, assignor to
Schmalbach-Lubeca-Werke Aktiengesellschaft, Braunschweig, Federal Republic of Germany
Filed June 28, 1971, Ser. No. 157,592
Claims priority, application Germany, July 3, 1970,
P 20 32 976.4
Int. Cl. B29c 17/07, 17/08, 17/14
U.S. Cl. 264—89
7 Claims

ABSTRACT OF THE DISCLOSURE

According to the present method, blanks for producing hollow bodies, such as containers, are provided with a finished opening by severing from a blank a lost head or two hollow bodies from each other or from a common lost head, by means of gauge pressure to which the blanks are subjected after they have been provided with rupture means, such as grooves, in the injection- or blow-molding step prior to the pressurizing step whereby the severing takes place with a clean rupture along said grooves.

BACKGROUND OF THE INVENTION

The present invention relates to a separating method for producing hollow bodies. More specifically, the invention relates to improvements in a method for producing hollow bodies by the injection- or blow-molding processes.

In connection with the so called injection- or blow-molding method, it cannot be avoided that the blanks which will result in the final product, such as containers, are connected to further elements, such as a lost head or another blank or a lost head which is common to two blanks. These elements must be severed in order to produce the final product and to provide the final product with an opening. It is desirable that no additional worksteps should be necessary for finishing the container opening. Thus, it is known to provide the blanks while they are still in the blow mold with rupture means extending along a predetermined line for separation along said line which later on will define the opening of the finished product. It has been found that the rupture means alone do not provide the desired clean separation.

Thus, several efforts have been made heretofore to solve the above problem. In one group of prior art suggestions, the severing takes place inside the blow- or injection-mold. Other attempts have been made to provide a clear severing after the blanks have been removed from the blow mold.

In connection with the severing inside the blow mold it is known to combine cutting means with the calibrating and with the blast nozzle or thorn. Rotating cutting means provided inside the tool or rather inside the blow mold are also well known in the art. Another suggestion in this respect is disclosed in German patent publication 1,479,494 wherein the portion of the blow mold in which the head is formed is lifted with a jerk in order to achieve the severing, for example of the lost head whereby the air pressure inside the hollow body which was necessary for the blow molding facilitates the lifting of the head portion of the blow mold.

Another prior art method for separating the lost head inside the blow mold comprises heating a small zone of the blowing tool so that a rupture means is produced. While the remaining wall portions of the hollow body are cooling down, a melting takes place in said small zone along the rupture means. However, even this method does not result in an entirely satisfactory, clean cut opening of the hollow body.

In another prior art approach to the above problem, it has been proposed to separate the lost head outside of the blow mold, for example, in connection with so called wide-mouthed or wide-necked containers. The separation outside of the blow mold is accomplished by so called "finish" devices comprising mechanical means and arranged for operation subsequent to the operation of the blowing device proper. Such "finish" devices comprise, for example milling means, cutting edges, stamping devices, saws or similar mechanical means.

Generally, the prior art has suggested as mentioned above to provide a rupture means which defines a separating plane whereby these rupture means facilitate the separation substantially. Such rupture means are produced during the blowing step itself. For this purpose, the blowing tool is provided with protruding edges which are usually rather pointed. The subsequent blowing step stretches the blank of plastic material more strongly over the protruding edges whereby said rupture means are produced in the form of thinner wall thicknesses along a line defined by said rupture means. The present invention uses the same materials as the prior art namely synthetic plastics materials.

Summarizing, it has been found that the above described prior art methods have the following drawback or disadvantages. Thus, the prior art requires additional tools such as milling means, saws, stamping knives or the like. A plurality of these tools are subject to substantial wear and tear, especially when these tools work against each other such as is the case with knives operating in a scissor fashion. The blowing tools proper are rather expensive and the need for combining the blowing tools with separating elements make the tools even more complicated and accordingly still more expensive.

Another serious drawback of the prior art is the fact that the severing does not result consistently in a clean cut. Thus, the quality of the severing must be continuously checked to see whether the resulting opening does not require further correcting worksteps. Moreover, the efficiency of prior art operations, especially the quantity produced in a given unit of time, is dependent upon the blowing frequency, for example, where the severing takes place inside the blow mold.

OBJECTS OF THE INVENTION

In view of the foregoing, it is the aim of the invention to achieve the following objects singly or in combination:

to provide a separation method which will overcome or avoid the above outlined drawbacks;

to provide a separation method which accomplishes the severing of the lost head from a blank or the severing of two containers from a common blank or from a common lost head without applying the above mentioned mechanical cutting or similarly operating severing tools;

to provide a severing method which may be employed independently of the frequency of operation of the blowing apparatus;

the present method is also to be equally efficient regardless of the dimensions of the containers to be produced, especially their cross-sectional shape and the size of their opening;

to provide a severing method which is amenable to an optimal mass production, that is, the present method is adaptable to an optimum hourly production rate;

to provide an apparatus for practicing the present method whereby such apparatus is constructed so as to employ to a large extent the production facilities presently available or to use these facilities with simple and thus inexpensive modifications; and to provide a severing margin or edge which surrounds an opening in the finished product in a clean-cut fashion so that additional finishing steps are avoided.

SUMMARY OF THE INVENTION

According to the invention there is provided a method for producing hollow bodies by the injection- or blow-molding process wherein a blank of a hollow body is provided with rupture means while the blank is in a mold, said rupture means extending along a predetermined line for separation along the line to provide a respective, predetermined opening in the hollow body by removing the blank of the hollow body from the blow mold after the blowing step and then subjecting the interior of the blank to a gauge pressure of such a strength that a rupture between coherent portions of the blank takes place along said line defined by the rupture means whereby no mechanical auxiliary means for the severing as such are employed. The invention has the advantage that the mechanical means for performing the method are kept to a minimum. Thus, according to the invention there is provided a blank transport means, for example a turntable which carries blank receiving means for transporting them to blank gripping means which are preferably reciprocable vertically in order to lift the blanks against a gauge pressure supply means arranged for cooperation with the gripping means.

An even more important advantage of the invention is seen in that the separated margins which are usually located in the area or near the opening of the hollow body and the end ridges or surfaces of these margins are properly finished or clean cut so that, for example, a closing of the opening immediately after the production of the hollow body is possible, for example by welding a film to the opening without any additional finishing working steps. The heretofore required smoothing step for finishing the end surfaces is thus avoided.

The prior art methods in which the separation, for example of a lost head from a blank, is accomplished when the blank has cooled down is not always usable where synthetic plastics are employed having a high tensile strength or tear stretching. However, such synthetic plastics are frequently required due to the characteristics which are desirable for the finished product. Accordingly, as a result fuzzy edges may occur along the rupture line. Such fuzzy edges impede the subsequent closing step of the container, for example by means of welding a film over the opening. As a matter of fact, such closing of the fuzzy edges is sometimes altogether impossible. The invention overcomes this drawback by producing the internal gauge pressure as a pressure blast. In this manner the above mentioned fuzzing along the margins where the separation takes place is avoided. It will be appreciated that the fuzzing is actually a result of a material flow. A material flow is prevented according to the invention due to the explosion like rupture accomplished by the invention.

According to yet another feature of the invention, it is pressure inside the blank is produced by feeding air under pressure from the exterior of the blank into the blank. This has the advantage that the pressurized air which is available for the blowing step in the production of the hollow bodies may also be used for the severing step according to the invention. This reduces the required structural elements to a minimum. To practice the invention effectively it is not necessary to employ pressurized air. Any other suitable gases or gas like media may be employed.

According to yet another feature of the invention, it is preferable to create the gauge pressure inside the hollow body after the hollow body has cooled down subsequent to the blowing step. More specifically, the severing of a lost head from the blank which forms the hollow body takes place by gripping the lost head to lift the blank out of the blow mold, whereupon the lifted blank suspended from its lost head is connected to a blow nozzle whereby the hollow body is blown off from the lost head upon introducing pressurized air through a blowhole, preferably in the lost head. Thereafter the blown off lost head is separately removed.

BRIEF FIGURE DESCRIPTION

In order that the invention may be clearly understood, it will now be described, by way of example, with reference to the accompanying drawings, wherein.

DESCRIPTION OF EXAMPLE EMBODIMENTS

Referring to FIGS. 1, 2, 3, and 4 there is shown a blank B which comprises a hollow body 1 and a lost head 2. This blank has been produced in accordance with the injection- or blow-molding process. The fact that the so called injection- or blow-molding results in said lost head is well known and inherent in these production methods. Therefore, a further elaboration in this respect is not necessary.

Figure 6:
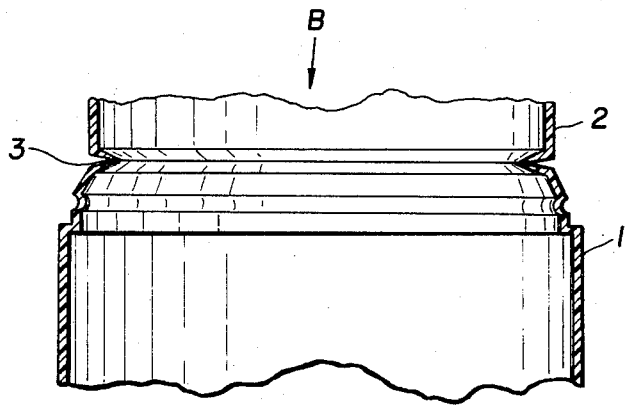
FIG. 6 illustrates a sectional view through the upper portion of a hollow body produced according to the present method.

A sectional partial view of the blank B is also shown in FIG. 6 on a slightly enlarged scale relative to FIGS. 1 to 4. The finished product of the blank shown will be a so called wide-necked container. As will be seen from FIG. 6, the hollow body 1 of the blank B is separated from the lost head 2 by a groove 3 constituting one example of a rupture means which defines a line along which the lost head 2 is to be separated from the hollow body 1. The rupture means or grooves 3 are produced by a respective sharp edged ridge in the blow mold as is known in the art. The cutting edge has a given cutting angle and is rather sharp whereby the rupture means are produced when the blank is blown up in the blow mold.

Figure 5:
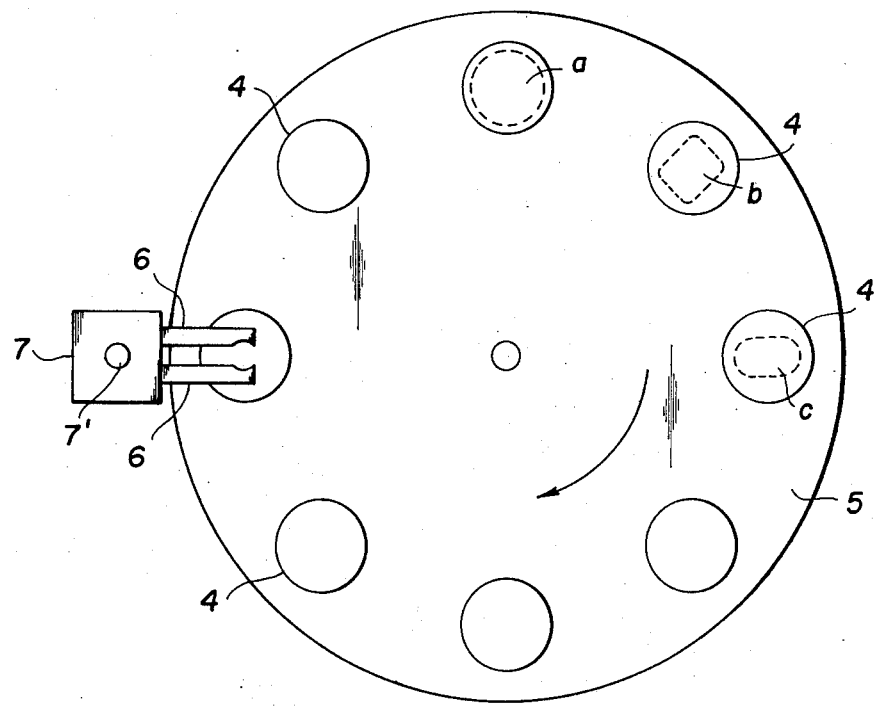
FIG. 5 is a top view onto an apparatus for peforming the present method, however, omitting the pressure supply means.

According to the invention, the blank B is removed from its blow mold (not shown) and placed into blank receiving means, such as a receptacle 4, supported on blank transport means, such as a turntable 5. The receptacles 4 are arranged, for example, concentrically on the upper surface of the turntable 5 as is seen in FIG. 5. The turntable 5 is rotated in the direction of the arrow by any suitable and well known means. The receptacles 4 have a receiving space shaped to accommodate the shape of the respective hollow bodies. Thus, the receiving space "a" is circular whereas the receving space "b" is rectangular and the receiving space "c" is oval or elliptical.

The present apparatus comprises in addition to the blank transport and receiving means, a blank gripping device 6 which extends above and over the blank transporting turntable 5. Further there is provided a pressure supply means, such as a blow nozzle 8 also arranged, preferably in a stationary position, above the turntable 5.

These three elements, namely the turntable 5, the gripping means 6 and the blow nozzle 8 may be arranged immediately following the blow- or injection-molding apparatus proper. It will be noted that the three elements are simple in their construction and rather certain and safe in their function. The gripping means are supported on a guide rail 7' along which the gripping means are movable up and down in the direction of the arrow 7'' by a movable support 7. The arrangement is such that the gripping means 6, the blow nozzle 8, and the blank receiving receptacles 4 may be aligned with respect to each other and with respect to a common vertical axis as indicated by the arrow 8' in FIG. 3. For embodying the just described features it is possible to employ a so called trimming apparatus modified with the just described features according to the invention.

Preferably the gripping means 6 comprise a tongue as best seen in FIG. 5 for gripping the lost head 2 of the hollow body 1. Please see FIG. 2. The support 7 may be moved vertically up and down on the guide rail 7', for example by well known pneumatic means.

Figure 1:
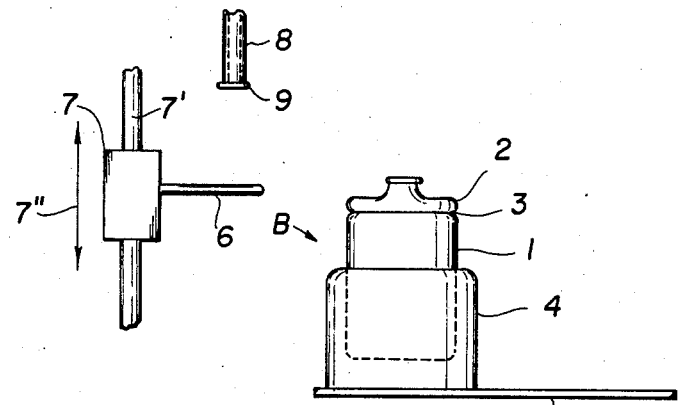
FIGS. 1 to 4 illustrate the steps performed according to the method of this invention whereby the respective apparatus elements are shown in a schematic fashion.

The above mentioned vertical alignment of the blow nozzle 8 and the gripping tongue 6 is accomplished by locating these two elements as shown in FIG. 1 relative to each other and by rotating the turntable 5 so as to bring one of the receptacles also into said alignment.

The tongue 6 may have an adjustable gripping width for handling a plurality of differently shaped containers, especially having different diameters or more specifically lost heads of different diameters. The gripping width of the tongue 6 may be adjusted in a well known manner, for example by pneumatic means not shown.

Figure 2:
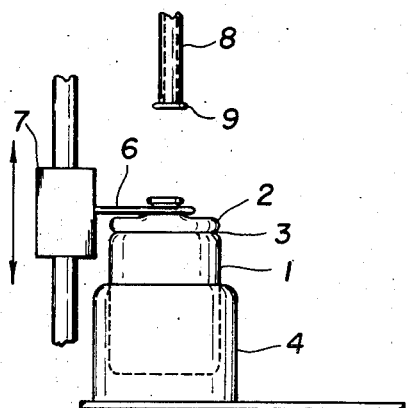
Figure 3:
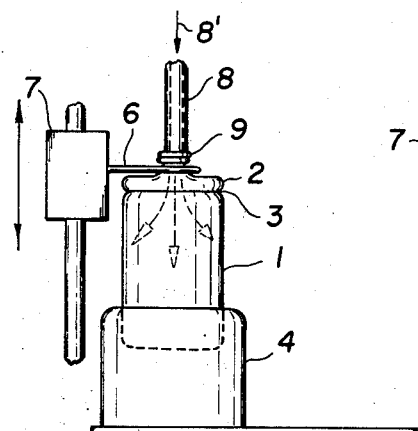

After gripping the lost head as shown in FIG. 2, the next step, namely lifting the blank out of the receptacle 4 is shown in FIG. 3. As mentioned, the vertical up and down movement of the support 7 may also be accomplished by any well known mechanical, pneumatic, or hydraulic means.

The hollow body 1 is lifted out of its receptacle 4 to such an extent that a flow hole in the lost head 2 comes into contact with the blow nozzle 8, the lower end of which is provided with sealing means, such as a gasket 9. This gasket is preferably a part of the blow nozzle 8 and thus also held in a fixed position. The upward stroke of the support 7 is such so as to forcefully press the blow opening against the gasket to provide the required gas tight sealing.

In connection with the just described step of lifting the hollow body 1, it will be appreciated that the blank is freely suspended from the gripping tongue 6 whereby a certain deformation of the blank and especially of the hollow body 1 is permitted when the interior of the hollow body is subjected to the gauge pressure according to the invention. It has been found that this greatly facilitates the explosion like blowing off of the lost head 2. In this manner a rather good and clean-cut separation is accomplished which does not require any subsequent finishing step. Since the material of which the hollow body is made has a certain elasticity, it returns into its original shape when the explosion like separation is completed.

The above mentioned gasket 9 has, incidentally, the advantage that a rapid disconnection of the blow opening from the blow nozzle 8 is assured whereby a high production rate per hour is accomplished.

With regard to the requirement that the blank should be freely suspended at the time when it is subjected to the blowing off of the lost head, it will be noted from FIG. 3 that it is not necessary to entirely remove the hollow body 1 from the receptacle 4. It is sufficient to lift the hollow body approximately ¾ of its entire length out of the receptacle 4 so that aproximately ¼ of its length remains in the receptacle. This has the advantage that the hollow body subsequent to the blowing off of the lost head 2 will fall back into the receptacle 4. While this feature is advantageous, it is not absolutely necessary for practicing the present invention and it is quite possible to lift the blank completely out of the receptacle so that it is freely suspended. In any event, the length of the stroke of the support 7 will depend on the dimensions of the entire apparatus and the just discussed considerations.

Figure 4:
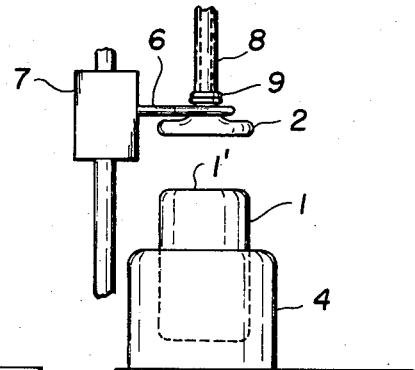

Once the lost head blow opening has been brought into sealed contact with the blow nozzle 8, the interior of the hollow body 1 is subjected to a gauge pressure supplied through the blow nozzle 8. According to the invention, the gauge pressure is, preferably suddenly, increased to such a force that the hollow body 1 is blown off the lost head 2 without any additional mechanical auxiliary means. This is shown in FIG. 4 where it will be noted that the hollow body 1 has been blown off by the pressure symbolized in FIG. 3 by the dashed arrows inside the hollow body 1 as seen in FIG. 3. After the separation, the hollow body 1 is received again in the receptacle 4 as seen in FIG. 4. The separation edge 1' which simultaneously forms the opening of the container, has a clean-cut edge so that no additional finishing work is necessary.

The lost head 2 which in FIG. 4 is still held in the gripping tongue 6 is then removed from the tongues, for example by stripping it off mechanically, or by sucking it off pneumatically or in any other suitable manner. Thereafter, in synchronism with the stepwise or intermittent advance of the turntable 5 which moves another blank into alignment with the gripping tongues 6 and the blow nozzle 8, the support 7 is moved downwardly back into the position shown in FIG. 2 so that the lost head 2 of a newly advanced blank may be gripped by the tongues 6. Thus, the above described steps are repeated.

Although the above described device has been found to be most advantageous, especially with regard to the fact that it is possible to modify in a surprisingly simple manner the devices which are generally employed with injection- or blow-molding apparatus such devices usually comprising the so called "finish" means, such as a trimmer. However, it is also possible to embody the invention by different means. For example the turntable 5 could be replaced by an endless conveyor and the support 7 with its gripping tongues 6 could, for example be tiltable rather than movable vertically up and down. In this latter modification, the blow nozzle 8 would be arranged at a different level and it might be stationary or movable.

Figure 7:
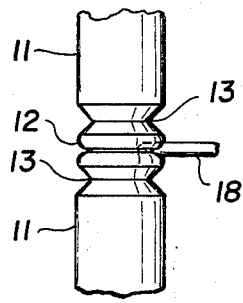
FIG. 7 is a schematic representation of the simultaneous production of two hollow bodies from a blank which is interconnected by a common lost head.

So far the method according to the invention has been described with reference to severing a lost head from the blank. However, the invention is not limited to this particular operation. The present method is also suitable for simultaneously producing two or even more hollow bodies which, for example, may be connected to each other in a common blank along a rupture line or which may be interconnected by a common lost head, as is shown in FIG. 7. In practicing the present invention as illustrated in FIG. 7, an injection needle 18 is provided for supplying the gauge pressure to the interior of the blank. Where two heads are directly interconnected along a rupture line, it is possible that the insertion of the injection needle 18 into the rupture line as shown, for example, at 13 in FIG. 7 may result in a slight interruption of the opening defining edge of the hollow body. However, it has been found that such slight interruption does not impair the generally clean-cut edge achieved by the invention.

Referring to FIG. 7, the two hollow bodies 11 are interconnected by a common lost head 12. Between each hollow body 11 and the respective side of the head 12, there is arranged a rupture groove 13. Accordingly, the blow mold is provided with two knife shaped edges. As mentioned, the increased gauge pressure is preferably or suitably introduced into the two hollow bodies simultaneously and preferably in the form of a pressure blast by inserting into the lost head 12 an injection needle 18 connected to a source of pressure not shown. In this connection, the rupture grooves 13 should be uniform relative to each other that is, the reduced wall thickness throughout the two grooves 13 should be uniform in order to assure a simultaneous blowing off of the two hollow bodies 11.

The apparatus for performing the blowing off as described with reference to FIG. 7 will basically have the same features as the apparatus described above except, the arrangement of the injection needle 18 will differ from that of the blow nozzle 8. The receptacles 4 would also be adapted to the double blanks shown in FIG. 7.

Although the invention has been described with reference to specific examples, it is to be understood that it is intended to cover all modifications and equivalents within the scope of the appended claims.

What I claim is:

1. In a method for producing a hollow body by the blow molding process, wherein a hollow blank is blown into a mold having grooving means therein whereby the hollow blank assumes the shape of the mold to form said body while said grooving means simultaneously produce in said body a rupture groove which defines a line of separation between the hollow body proper and a lost head, the improvement comprising gripping said lost head, removing said formed body from said mold to hold said formed body in a substantially freely suspended position, sealingly connecting a blow means to said formed body, and again substantially suddenly blowing a pressure medium into the formed body from the outside thereof, through said blow means until the gauge pressure inside the hollow body pops the hollow body whereby said hollow body is severed from said lost head along the entire length of said rupture groove.

2. The method according to claim 1, wherein said popping severs two adjacent bodies from a common lost head, while the bodies are removed from said mold, by substantially suddenly increasing said gauge pressure through said blow means until said popping occurs.

3. The method according to claim 1, wherein said hollow blank is made of synthetic plastics material which is permitted to set prior to said removal from said mold and prior to introducing said pressure medium into said formed body.

4. The method according to claim 1, wherein said formed body is removed from said mold by lifting and then suspending the hollow body above a receptacle so that the formed body proper will drop into said receptacle when said popping takes place.

5. The method according to claim 1, wherein said blow means is brought into operative contact with a blow opening in said lost head.

6. A method of producing a hollow body of plastics material by the blow molding process comprising, blowing in a first blowing step a blank of synthetic plastics material into a mold at a given temperature whereby the blank assumes the shape of the mold to form said hollow body, forming during said first blowing step a rupture groove in said hollow body by pressing said plastics material against respective grooving means in said mold, said rupture groove separating a lost head from the hollow body proper, allowing said plastics material to set, removing said hollow body from said mold, gripping said lost head for freely suspending said hollow body above and in alignment with a receptacle, sealingly connecting a blowing means to said formed hollow body, and performing a second blowing step by substantially suddenly introducing from the outside of said body a burst of pressure medium into said formed body through said blowing means until the gauge pressure inside the hollow body pops the hollow body along said rupture groove, whereby the hollow body drops into said receptacle.

7. The method according to claim 6, wherein said hollow body is partially inserted into said receptacle prior to said second blowing step.

References Cited

UNITED STATES PATENTS

| | | | |
|---|---|---|---|
| 1,409,154 | 3/1922 | Davis | 264—154 XR |
| 3,718,724 | 2/1973 | Holzmann et al. | 264—98 |
| 2,994,103 | 8/1961 | Schaich | 264—161 XR |

FOREIGN PATENTS

| | | | |
|---|---|---|---|
| 1,167,513 | 10/1969 | Great Britain | 264—94 |

ROBERT F. WHITE, Primary Examiner

J. H. SILBAUGH, Assistant Examiner

U.S. Cl. X.R.

225—1, 93; 264—94, 157, 161; 425—302 B, 806